United States Patent [19]

Oliver

[11] E Patent Number: Re. 31,910

[45] Reissued Date of Patent: Jun. 11, 1985

[54] REMOVABLE CORE CYLINDER LOCK

[75] Inventor: Roy N. Oliver, Salem, Va.

[73] Assignee: Medeco Security Locks, Inc., Salem, Va.

[21] Appl. No.: 606,689

[22] Filed: May 3, 1984

Related U.S. Patent Documents

Reissue of:

[64] Patent No.: 4,328,690
Issued: May 11, 1982
Appl. No.: 175,220
Filed: Aug. 4, 1980

[51] Int. Cl.[3] ..... E05B 27/04

[52] U.S. Cl. ..... 70/369; 70/364 A

[58] Field of Search ..... 70/367, 368, 369, 337, 70/340, 364 A, 379 R, 380

[56] References Cited

U.S. PATENT DOCUMENTS

| | | | |
|---|---|---|---|
| 2,814,941 | 12/1957 | Best | 70/340 |
| 3,206,958 | 9/1965 | Best | 70/373 |
| 3,298,211 | 1/1967 | Russell | 70/369 |
| 3,499,302 | 3/1970 | Spain | 70/364 A |
| 3,667,264 | 6/1972 | Surko | 70/369 |
| 4,075,878 | 2/1978 | Best | 70/49 |

*Primary Examiner*—Robert L. Wolfe
*Attorney, Agent, or Firm*—Bernard, Rothwell & Brown

[57] ABSTRACT

A removable core cylinder lock utilizing twisting tumblers and a latch bar provides maximum security. Both operating and control keys have at least one skew cut bit to operating the twisting tumblers. A centrally positioned cylinder retainer is rotatable with a control key to remove the lock from its shell.

7 Claims, 17 Drawing Figures

FIG. 1
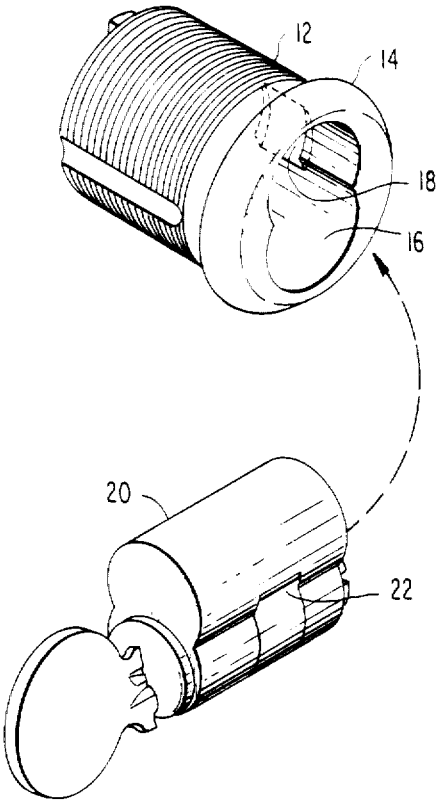
FIG. 3
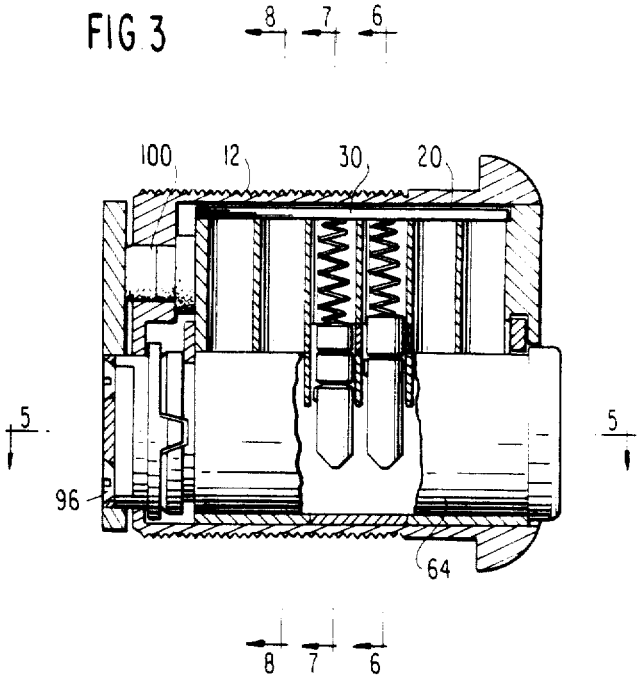
FIG. 5
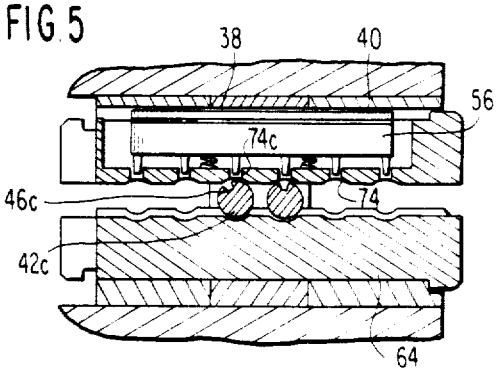
FIG. 5A
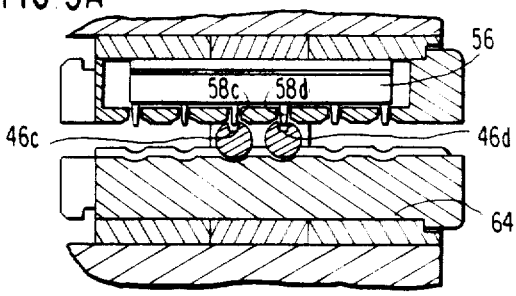
FIG. 5B
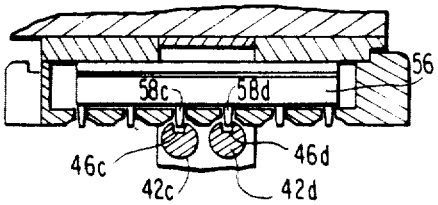
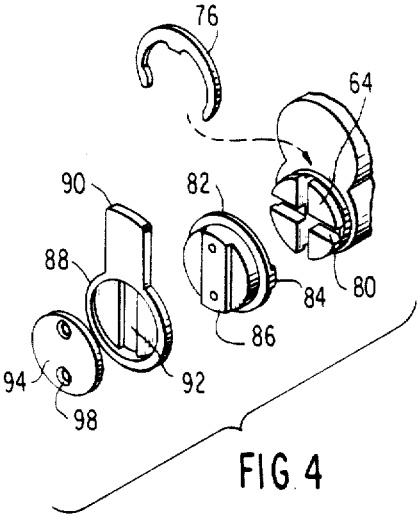
FIG. 4

FIG 6
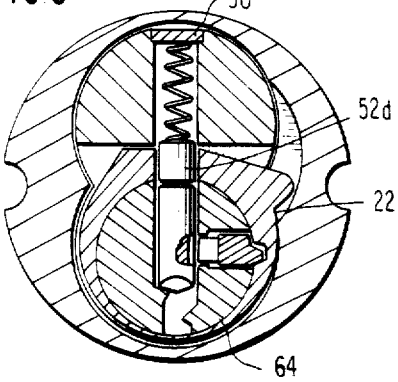
FIG 7
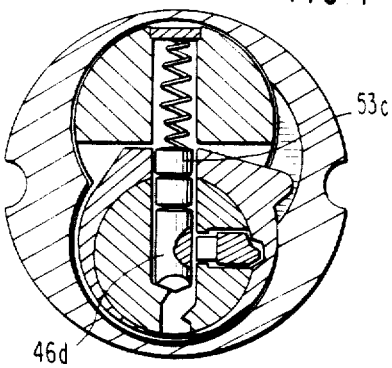
FIG 6A
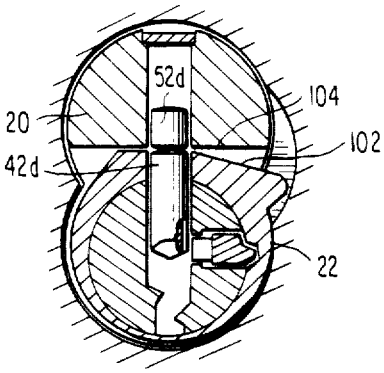
FIG 7A
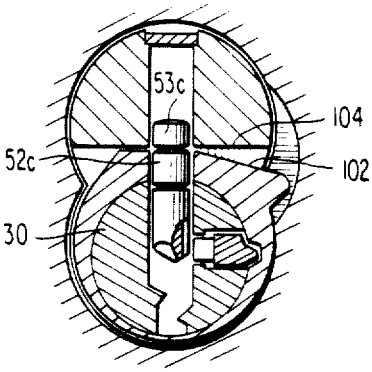
FIG 8
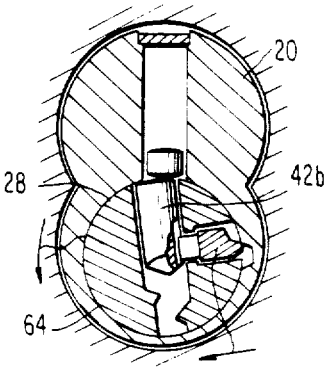
FIG 6B
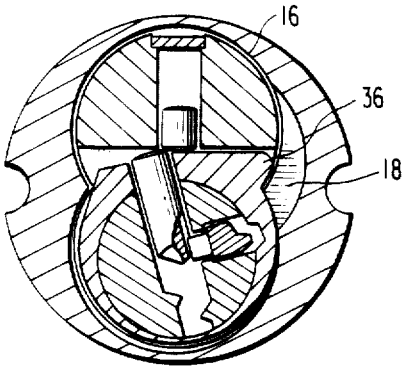
FIG 6C
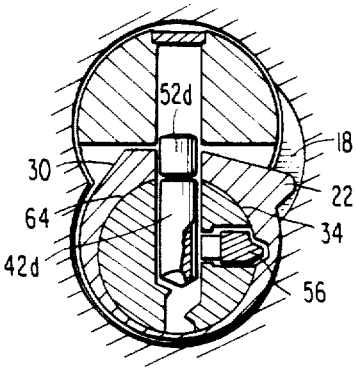
FIG 7B
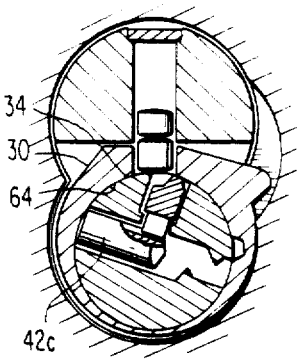
FIG 9
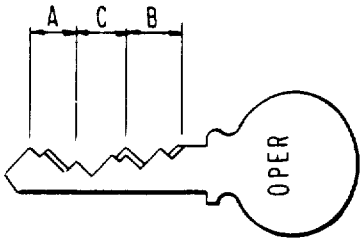
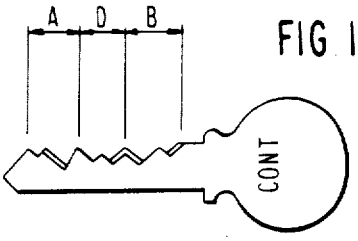
FIG 10

REMOVABLE CORE CYLINDER LOCK

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to improvements in removable core cylinder locks and particularly to a removable core cylinder lock utilizing twisting tumblers operable by keys having at least some skew cut bits.

2. Prior Art

Removable core cylinder locks are known in the prior art as has existed for about half a century. See for example the patents to Falk, U.S. Pat. No. 1,832,108 (1931); Voight, U.S. Pat No. 1,964,787 (1934); Falk, U.S. Pat. No. 2,061,456 (1936); Ledin, U.S. Pat. No. 2,268,511 (1941); Johnstone, U.S. Pat. No. 2,379,862 (1945); Check, U.S. Pat. No. 3,009,349 (1961); Best, U.S. Pat. No. 3,206,958 (1965); Oliver et al, U.S. Pat. No. 3,713,311 (1973); and others in this art.

Typically, a removable core cylinder lock is removable from a lock housing under the control of a control key for removing and e.g., replacing, the core. An operating key is used to operate the lock in its normal condition and does not affect the removability of the core. Some of the prior art use a special configured key for the control key, but all of the relevant prior art utilizes conventional pin tumblers and are therefore subject to picking, thus limiting the amount of security they afford. That is, they are pickable to the same extent that pin tumblers locks of their configuration are pickable. Conventional tumbler locks are also more subject to security violations with unauthorized duplicated control keys. Further, much of the prior art removable core cylinder locks are of complex construction and difficult to assemble.

Twisting tumbler locks utilizing a side bar or latch bar are known and are sold commerically by Medeco Security Locks, Inc. of Salem, Virginia and are made under the Oliver et al patent, RE 30,198 a reissue of U.S. Pat. No. 3,499,302 (1970). However, insofar as is known twisting tumbler locks have never been utilized in removable core cylinder locks because of the difficulty imposed by the configuration and the position of the latch bar.

SUMMARY OF THE INVENTION

This invention overcomes the disadvantages of the prior art by providing a high security removable core cylinder lock utilizing the twisting tumbler principle and having a latch bar and a core retainer. The core retainer cooperates with a recess in the fixed cylinder to lock the removable core in place but is movable to remove the core under the operation at least one of the central pin tumblers which is raised to a shear-line between the retainer and its case, the shear-line of the other tumblers being the same as under normal operating conditions. The retainer is in the center portion of the casing providing additional ruggedness in the construction. The construction is relatively simple and easy to adapt to the twisting tumbler Medeco-type cylinder lock.

BRIEF DESCRIPTION OF THE DRAWINGS

FIG. 1 is a perspective view of the removable core cylinder lock of this invention with the lock removed from its shell.

FIG. 3 is a partial sectional view of the removable core cylinder lock of this invention omitting two twisting tumbler pin assemblies on each end for the sake of clarity.

FIG. 4 is an exploded perspective view of the components on the inside end of the removable core.

FIG. 5 is a horizontal elevational view taken along line 5—5 of FIG. 3.

FIG. 5A is a view similar to FIG. 5 when an operating key has been inserted.

FIG. 5B is a view similar to a portion of FIG. 5 when a control key having desired arrangement of skew cuts has been inserted.

FIG. 6 is a transverse sectional view taken along lines 6—6 of FIG. 3.

FIG. 6A is a schematic view in sectional elevation similar to FIG. 6 in which a key (not shown) has raised the tumbler to the shear-line of the retainer.

FIG. 6B is a schematic view similar to FIG. 6A when a control key having proper skew cut bits has rotated the retainer and cylinder to allow the core to be removed.

FIG. 6C is a similar schematic view illustrating the insertion of an operating key with proper skew cut bits allowing the cylinder to be turned on its shear-line and the retainer to be retained.

FIG. 7 is a sectional view taken along lines 7—7 of FIG. 3.

FIG. 7A is a schematic sectional elevational similar to FIG. 7 showing the tumbler pin orientation when a control key has been inserted to position it.

FIG. 7B is a schematic view transverse elevation similar to FIG. 7A showing rotation of the cylinder after a proper operating key has been inserted.

FIG. 8 is a schematic elevational view taken along line 8—8 of FIG. 3 showing a proper operating or control key raising the tumbler to the shear-line.

FIG. 9 is an elevation view of a operating key having six bits some of which are skewed.

FIG. 10 is an elevational view of a control key having six bits which are cut at the same angles as the operating key but the bits in the center being of different depths.

DESCRIPTION OF THE PREFERRED EMBODIMENT

Figure 2:
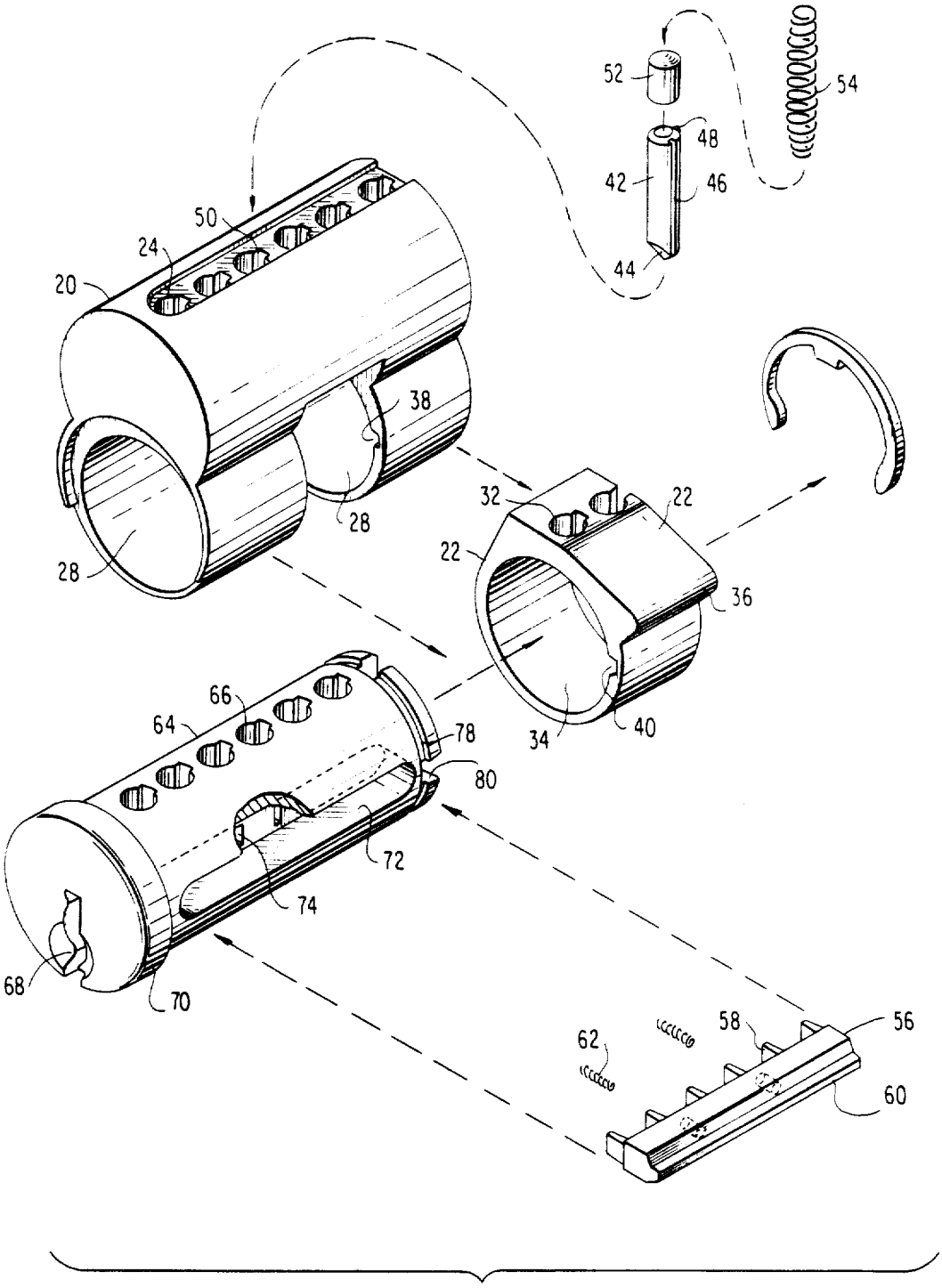
FIG. 2 is an exploded perspective view of the components of the removable core cylinder lock showing their arrangement with regard to assembly.

As shown in FIG. 1 the removable core cylinder lock of this invention includes a stationary shell 12 which may have a conventional rim 14 and a cavity 16 extending completely through the core for the reception of a cylinder lock case. In the wall of cavity 16 there is a recess 18 for cooperating with a core locking retainer. The shell 12 is, other than cavity 16 and recess 18, configured generally in accordance with commercial cylinder locks made by Medeco Security Locks, Inc. of Salem, Va.

As shown in FIG. 1 the removable core cylinder lock includes an interchangeable cylinder lock case 20 having an outside surface configuration to slidably mate with cavity 16. A movable core locking retainer 22 may be extended into recess 18 to lock the core in place or, under the control of a control key may be retracted to the position shown in FIG. 1 in order to remove the core.

The lock case 20 and the components therein are shown in exploded perspective form in FIG. 2. As shown therein the lock case 20 has a plurality of pin tumbler holes 24, in the embodiment shown there are six. The case also includes an interrupted cylindrically shaped passage 28.

The cylinder locking retainer 22 has a pair of pin tumbler holes 32 therein forming an extension of pin tumbler holes 24. It also is shaped to cooperate with the case and has a internal cylindrical passage 34 which forms a completed cylindrical passage through the lock case and the retainer when they are assembled. The retainer 22 is also rotatable in the case about the axis of the completed cylinder passage to cause projection 36 to move into cavity 18 or to be retracted against the profile of the case 20. A latch bar groove 38 is formed in the side of the cylindrical passage in the case 20, and latch bar groove 40 in the retainer 22 forms an extension thereof.

Positioned within each pin tumbler hole is a pin tumbler 42 (although only one is shown in FIG. 2) having a pointed lower end 44 for cooperating with skew cut bits of the key and rotating the tumbler about its vertical axis, i.e., twisting the tumbler. Each tumbler also has a vertical groove 46 for cooperating with projections of a latch bar, and a twisting movement limiting projection 48. Projection 48 cooperates with the edges of a vertical slot 50 in the tumbler hole 24 to limit the amount of twisting or rotary movement. Above each tumbler there may be one or more drivers or [waffers] *wafers* 52, and the tumbler and [waffers] *wafers* are biased downwardly by spring 54 in each tumbler hole. The top of the tumbler holes are covered by a cover plate 30.

A latch bar 56 (sometimes also known as a side bar) includes a plurality of projections 58, one at the position of each pin tumbler. These projections cooperate with vertical grooves 46 in the pin tumblers when the tumblers are correctly oriented in an angular position. The side 60 of the latch bar 56 opposite the projections 58 is shaped to cooperate in the latch bar grooves 40 and 38 and to move in and out of the grooves depending upon the position of the projections 58 in the grooves 46 of the tumblers. Springs 62 bias the latch bar outwardly of the center of the lock.

A lock cylinder 64 is of such a diameter as to fit into the completed cylindrical passageway 28,34 and includes a plurality of pin tumbler holes 66 of the same cross sectional shape as tumbler holes 24 and 32. The cylinder includes a suitable shaped key way 68, a front flange 70, and a latch bar slot 72. At the inner side of the latch bar slot there are holes 74 for reception of projections 58 on the latch bar 56.

The cylinder is held in the cylindrical passageway by a spring clamp 76 cooperating with a groove 78 on the inner end of the cylinder.

FIG. 3 shows the components in assembled position and partially sectioned. The pin tumbler assemblies for the first, second, fifth and sixth tumblers have been omitted for the sake of clarity. The cylinder 64 is held in the cylinder case 20 and, if the tumblers and drivers are correct position, may rotate to operate the lock.

One type of operating mechanism is shown in FIG. 4 and includes a cam adapter 82 cooperating with a slotted face 80 on the end of the cylinder 64. The cam adapter 82 has projection 84 on one side and a projection 86 on the other side. An operating member 88 with an operating tang 90 is attached to cam adapter 82 via slot 92. A retaining disc 94 has screws 96 passing through holes 98 to retain the parts in assembled position. A pad member 100 extends through the shell 12 and bears on the inner end of the case 20 and on the operating tang 90.

FIG. 5 is a longitudinal sectional view of the cylinder showing the operation of the latch bar 56 in the locked position. Because tumbler 42c has its groove 46c not facing the slot 74c, projection 58c cannot enter slot 46c, the latch bar 56 may not be cammed inwardly, and it remains in the slot 38, 40 thus preventing the cylinder 64 from turning even if all tumblers were raised to the shear-line.

FIG. 5A is a view similar to FIG. 5 but showing the situation that will obtain when an operating key having the proper arrangement of skew cuts has been inserted. As can be seen the projections 58c and 58d cooperate with the corresponding grooves 46c and 46d to allow the latch bar 56 to be cammed or forced inwardly from the position in FIG. 5A and thus allows the cylinder 64 to rotate and operate the lock as all tumblers are raised to the operating shear-line.

FIG. 5B is a view similar to FIG. 5A in which a control key having the desired arrangement of skew cuts has been inserted. Again, it can be seen that the tumblers 42c and 42d have been twisted to the position to present their slots 46c and 46d to the projections 58c and 58d of the latch bar 56 thus allowing the latch bar to be cammed forwardly and allowing rotation (because the tumblers have been lifted to the correct height of a control shear-line) of the cylinder retainer 22.

FIG. 6 is a section elevation through the third tumbler from the front. As shown in FIG. 6 without a key inserted, neither the cylinder 64 or the retainer 22 may be rotated even though the tumbler may be correctly oriented angularly, because the driver 52d blocks rotation of both the cylinder and the retainer.

As shown in FIG. 6A a portion of a shear-line is defined by the surface 102 of the retainer 22 and the surface 104 of the case 20 at the third tumbler. When a *control* key (not shown) is inserted to properly raise and twist the tumbler as shown in FIG. 6A, a parting may occur at the shear-line between the top of the tumbler 42d and the bottom of driver 52d. This allows the entire retainer 22 to be rotated counterclockwise to the position shown in FIG. 6B causing the projection 36 to clear the recess 18 and present a profile configuration corresponding to the cavity 16 to allow the core to be removed.

FIG. 6C shows the situation where a proper operating key has been inserted. For the third tumbler the division between the top of the tumbler 42d and the bottom of driver 52d is at a shear-line defined by the periphery of the cylinder 64 and the cylindrical passageway 34 in the retainer. The movement of the key counterclockwise will cause the latch bar 56 to cam inwardly and allow the lock to be operated in its normal fashion without affecting the position of the retainer 22 which locks the entire core into recess 18 by virtue of projection 36.

FIG. 7 is a transverse sectional elevation through the fourth tumbler 46c and shows the parts in normal condition without the key. FIG. 7A is the position of the components with a properly bitted control key (not shown) inserted so as to cause the top of driver 52c and the bottom of wafer 53c to be at a parting line between the top surface 102 on the retainer 22 and an internal surface 104 on the case 20. Assuming that the third and forth tumblers have been properly twisted and raised as in FIGS. 6A and 7A and the remaining tumblers have been properly twisted and raised to the shear line defined by the cylinder and its case, the control key when rotated counterclockwise in FIG. 7A will rotate the retainer 22 to the retracted position such as shown in FIG. 6B.

FIG. 7B shows the situation at the fourth tumbler with the use of a proper operating key (not shown). The proper operating key raises and twists the tumbler 42c so that there is a parting line or shear-line defined by the outer surface of cylinder 64 and the cylinder passageway 34 in retainer 22.

FIG. 8 is a sectional view of the fifth tumbler hole which is located in the section of the lock where the retainer 22 is not present, and is typical of the first, second and sixth tumblers as well. In this section the tumbler 42b is raised and rotated to the proper position at the shear-line defined by the cylindrical surface 28 in the inside case 20 and the outside surface of cylinder 64 *by either the control key or the operating key*. Thus, the shear-line for the operating key mode is between the continuous cylindrical passage in the case 20 and retainer 22 and the outside surface of cylinder 64. However, the shear line in the case of the control key mode is the same shear-line for tumblers 1, 2, 5 and 6 but at tumblers 3 and 4 the shear-line moves upwardly to that defined by a parting line between surfaces 102 and 104.

FIG. 9 shows an operating key and FIG. 10 shows a control key, both of which have skew cut bits in accordance with the Medeco Security Locks, Inc. commercial embodiment. In both locks the cuts for the first, second, fifth and sixth bits are idential both with regard to depth of cut and angle while the center two bits of both keys are different with regard to depth but have the same angles.

As is apparent, other embodiments are possible within the scope of the appended claims.

We claim:

1. A removable core cylinder lock comprising:

(a) a cylinder lock shell have a cavity therethrough for reception of a cylinder lock case;

(b) means defining a retaining recess in the wall of the cavity intermediate the ends of the shell;

(c) an interchangeable cylinder lock case with an outside configuration to slidably fit into the cavity into the shell, the case including a plurality of pin tumbler holes and an interrupted cylindrical shape passage extending lengthwise of the case;

(d) a cylinder locking retainer having parallel pin tumbler holes and a cylindrical shaped passage shaped to correspond with the interrupted cylindrical shaped passages in the lock case to form a completed cylindrical passage through the lock case and retainer, the retainer being rotatable in the shell to a limited extent;

(e) a projection on the outer surface of the cylinder retainer for cooperating with the retainer recess when the retainer is rotated in one direction and clearing the retainer recess when the retainer is rotated in an opposite direction;

(f) means defining a latch bar groove in the wall of the completed cylindrically shaped passage in the lock case and retainer;

(g) twisting pin tumblers each having a pointed inner end and a longitudinal groove, one pin tumbler positioned in each pin tumbler hole in the lock case and retainer;

(h) a driver pin in each of the pin tumbler holes above the pin tumbler and means for biasing the driver pins and pin tumblers toward the longitudinal center of the case;

(i) a latch bar having projections from one side thereof cooperating with the longitudinal grooves in the pin tumblers when the tumblers are correctly oriented by a twisting movement, the opposite side of the latch bar from the projection being shaped to cooperate with the latch bar groove such that when any one projection is not in a tumbler groove, the latch bar will be kept seated in the latch bar groove (j) a cylinder having a key way, pin tumbler holes, a slot for lateral movement of the latch bar, and an outside cylindrical surface for rotary movement inside the completed cylindrical passageway in the case and the retainer;

(k) an operating key having at least some bits cut at skew angles to cause the tumblers to raise to a shear line defined by the outside surface of the cylinder and the completed cylindrical passage and to twist to present the longitudinal groove to the latch bar projections at each tumbler position thereby allow the operating key to rotate the cylinder and operate the locks;

(l) a control key having its bits cut at the same angles as the operating key, the bits causing the tumblers to raise to a core removal shear line defined by the surface of the retainer and a cooperating surface of the case for at least one tumbler and defined for the remaining tumblers by the outside surface of the cylinder and the completed cylinder passage, and to cause the tumblers to twist to present the longitudinal groove of each tumbler to the latch bar projections to allow the key to retract the retainer projection from the recess and allow the core to be removed.

2. A removable core cylinder lock as defined in claim 1 wherein the retainer is operated under the control of two bits of the control key.

3. A removable core cylinder lock as defined in claim 2 wherein the two bits of the control key have identical skew angles as the operating key but different depths of bitting.

4. A removable core cylinder lock as defined in claim 3 wherein both the operating key and control key has six bits and the two bits of the control key which operate the retainer are the middle two bits of the key.

5. A removable core cylinder lock removable from a cylinder lock shell having a cavity there through for a reception thereof and a recess in the wall of the cavity, the cylinder lock comprising:

(a) an interchangeable cylinder lock lock case with an outside configuration to slidably fit into the cavity into the shell, the case including a plurality of pin tumbler holes and an interrupted cylindrical shape passage extending lengthwise of the case;

(b) a cylinder locking retainer having parallel pin tumbler holes and a cylindrical shaped passage shaped to correspond with the interrupted cylindrical shaped passages in the lock case to form a completed cylindrical passage through the lock case and retainer, the retainer being rotatable in the shell to a limited extend;

(c) a projection on the outer surface of the cylinder retainer for cooperating with the retainer recess when the retainer is rotated in one direction and clearing the retainer recess when the [retained] *retainer* is rotated in an opposite direction;

(d) means defining a latch bar groove in the wall of the completed cylindrically shaped passage in the lock case and retainer;

(e) twisting pin tumblers each having a pointed inner end and a longitudinal groove, one pin tumbler positioned in each pin tumbler hole in the lock case and retainer;

(f) a driver pin in each of the pin tumbler holes above the pin tumbler and means for biasing the driver pins and pin tumblers toward the longitudinal center of the case;

(g) a latch bar having projections from one side thereof cooperating with the longitudinal grooves in the pin tumblers when the tumblers are correctly oriented by a twisting movement, the opposite side of the latch bar from the projection being shaped to cooperate with the latch bar groove such that when any one projection is not in a tumbler groove, the latch bar will be kept seated in the latch bar groove;

(h) a cylinder having a key way, pin tumbler holes, a slot for lateral movement of the latch bar, and an outside cylindrical surface for rotary movement inside the completed cylindrical passageway in the case and the retainer;

the arrangement being such that an operating key having at least some bits cut at skew angles will cause the tumblers to raise to a shear line defined by the outside surface of the cylinder and the completed cylindrical passage and to twist to present the longitudinal groove to the latch bar projections at each tumbler position to thereby allow the operating key to rotate the cylinder and operate the locks; and a control key having bits cut at the same angles as the operating key, to cause the tumblers to raise to a core removal shear line defined by the surface of the retainer and a cooperating surface of the case for at least one tumbler and defined for the remaining tumblers by the outside surface of the cylinder and the completed cylinder passage, and to cause the tumblers to twist to present the longitudinal groove of each tumbler to the latch bar projections to allow the key to retract the retainer projection from the recess and allow the core to be removed.

*6. A removable core cylinder lock comprising:*

*(a) a cylinder lock shell having a cavity therethrough for reception of a cylinder lock case;*

*(b) means defining a retaining recess in a wall of the cavity in the cylinder lock shell;*

*(c) an interchangeable cylinder lock case with a sectional configuration allowing it to slidably fit into the cavity in the cylinder lock shell, the case including a cylindrically-shaped passageway extending lengthwise therethrough;*

*(d) a cylinder locking retainer having a cylindrically-shaped passageway corresponding in diameter and shape to the cylindrically-shaped passageway in the cylinder lock case, the cylinder locking retainer being fitted into the cylinder lock case so that the cylindrically-shaped passage in the cylinder lock case and the cylindrically-shaped passage in the cylinder locking retainer form a completed cylindrical passage through the lock case and the retainer, the retainer being rotatable in the shell to a limited extent;*

*(e) a projection on the outer surface of the cylinder locking retainer for cooperating with the means defining a retaining recess when the retainer is rotated in one direction and clearing the retainer recess when the retainer is rotated in an opposite direction;*

*(f) means defining a latch bar groove in the wall of the cylindrically-shaped passage in both the lock case and retainer;*

*(g) a latch bar positioned in the means defining the latch bar groove in the wall of the lock case and retainer;*

*(h) pin tumblers positioned in pin tumbler holes in the lock case and retainer, and drive pins one in each pin tumbler hole above each pin tumbler, and means for biasing the drive pins and pin tumblers toward the longitudinal center of the case;*

*(i) a cylinder having a keyway for a key with means thereon to operate both the pin tumblers and the latch bar;*

*the arrangement being such that a proper operating key controls the pin tumblers and the latch bar to allow rotation of the cylinder and a proper control key operates the tumblers and latch bar to allow rotation of the cylinder locking retainer for removal of the cylinder lock case from the cylinder lock shell.*

*7. A removable core cylinder lock, removable from a cylinder lock shell having a cavity therethrough for reception of a cylinder lock, the cavity including a recess in the wall thereof for retaining a cylinder lock, the removable core cylinder lock comprising:*

*(a) an interchangeable cylinder lock case slidable into and out of the cavity in the cylinder lock shell under control of a proper control key, the cylinder lock case having a passage therethrough for reception of a lock cylinder;*

*(b) a cylinder locking retainer having a sectional configuration so as to present an outside profile the same as the profile of the passageway in the lock case, and having a passageway therethrough for the passage of a lock cylinder, the cylinder locking retainer being fitted with the interchangeable cylinder lock case so that the passageway through the cylinder lock case and the passageway through the cylinder lock retainer are aligned and the cylinder lock retainer may rotate relative to the cylinder lock case about the center of the passageway;*

*(c) the cylinder lock retainer including a projection which is movable upon rotation of the cylinder lock retainer in one direction to cooperate with the recess in the cavity of the cylinder lock shell and movable on rotation of the cylinder lock retainer in an opposite direction to clear the recess in the cavity in the cylinder lock shell;*

*(d) a lock cylinder slidable into the passageway in the cylinder lock case and cylinder locking retainer;*

*(e) a latch bar groove extending along both the cylinder lock case and the cylinder locking retainer;*

*(f) a latch bar in the latch bar groove, the latch bar being operable from a portion of a key to control rotation of the lock cylinder;*

*(g) locking means cooperating between the lock cylinder and the cylinder lock case for allowing a proper operating key to control rotation of the lock cylinder while not affecting rotation of the cylinder locking retainer and allowing a proper control key to control rotation of the lock cylinder retainer only; and*

*(h) a keyway in the lock cylinder for the reception of a proper operating key or a proper control key, the proper operating key controlling the latch bar and operation of the cylinder lock retainer to rotate the cylinder lock retainer for the purpose of clearing the retaining recess and allowing the cylinder lock case to be removed.*

* * * * *

UNITED STATES PATENT AND TRADEMARK OFFICE

CERTIFICATE OF CORRECTION

PATENT NO. : Re. 31,910

DATED : June 11, 1985

INVENTOR(S) : Roy N. OLIVER

It is certified that error appears in the above-identified patent and that said Letters Patent is hereby corrected as shown below:

Claim 7, column 8, line 33, change "passageway" to --passage--.
Claim 7, column 8, line 37, change "passageway" to --passage--.
Claim 7, column 8, line 49, change "passageway" to --passage--.
Claim 7, column 8, line 63, change "operating" to --control--.
Claim 7, column 8, line 50, after "and" insert --the passageway in the--.

Signed and Sealed this

Twentieth Day of August, 1996

Bruce Lehman

*Attest:*

BRUCE LEHMAN

*Attesting Officer*

*Commissioner of Patents and Trademarks*